US006289844B2

(12) United States Patent
Giannaris

(10) Patent No.: US 6,289,844 B2
(45) Date of Patent: Sep. 18, 2001

(54) MEDIUM FOR COLORING LIVE BAIT WORMS

(75) Inventor: Paul Giannaris, Toronto (CA)

(73) Assignee: Andy's Bait International Inc., Toronto (CA)

( * ) Notice: Subject to any disclaimer, the term of this patent is extended or adjusted under 35 U.S.C. 154(b) by 0 days.

(21) Appl. No.: 09/795,149

(22) Filed: Mar. 1, 2001

Related U.S. Application Data

(63) Continuation of application No. 09/468,955, filed on Dec. 22, 1999, now Pat. No. 6,240,876.

(51) Int. Cl.[7] .............................. A01K 29/00; A23L 1/27
(52) U.S. Cl. .................................................. 119/6.7; 426/1
(58) Field of Search .............................. 119/6.7; 43/4.5, 43/55; 426/1, 2

(56) References Cited

U.S. PATENT DOCUMENTS

| | | |
|---|---|---|
| 2,849,981 | 9/1958 | Rose et al. . |
| 2,867,055 * | 1/1959 | Lebiedzinski . |
| 2,961,319 * | 11/1960 | Stephan . |
| 3,115,864 * | 12/1963 | Wagner . |
| 3,526,988 | 9/1970 | Young . |
| 3,545,404 | 12/1970 | Loftus . |
| 3,889,638 | 6/1975 | Riley . |
| 3,918,190 | 11/1975 | Hornbeck . |
| 4,139,645 * | 2/1979 | Werner ................ 426/250 |
| 4,143,161 | 3/1979 | Ciulla . |
| 4,172,336 | 10/1979 | Aylor . |
| 4,239,782 | 12/1980 | Cinquemani . |
| 4,258,065 | 3/1981 | Ciulla . |
| 4,477,475 | 10/1984 | Fishman . |
| 4,486,460 | 12/1984 | Kienast et al. . |
| 4,728,514 | 3/1988 | Lechnir . |
| 4,776,858 | 10/1988 | Mayer . |
| 4,828,829 * | 5/1989 | Bethshears ............ 424/84 |
| 4,927,643 * | 5/1990 | D'Orazion et al. ........ 426/1 |
| 5,071,659 | 12/1991 | Shumaker . |
| 5,239,691 * | 8/1993 | Retzer et al. .............. 455/575 |
| 5,664,366 | 9/1997 | Lopuszanski et al. . |
| 6,048,554 | 4/2000 | Collins et al. . |

FOREIGN PATENT DOCUMENTS 57-198053 * 12/1982 (JP) ............................... 426/1

* cited by examiner

Primary Examiner—Charles T. Jordan
Assistant Examiner—Yvonne R. Abbott
(74) Attorney, Agent, or Firm—Ridout & Maybee

(57) ABSTRACT

A medium for coloring live bait worms comprises a cultivation bed containing one or more worm storage media and a non-toxic amount of a colorant. Live bait worms are incubated in the medium at a temperature and for a time sufficient to allow the bait worms to become colored by ingesting the medium. The colorant is preferably a D&C coloring additive such as a xanthene dye, most preferably D&C Yellow No. 8, and/or D&C Yellow No. 7, and the worm storage medium is preferably peat loam. The worms become colored during an incubation period of up to about one week and retain their color for a prolonged period of time after being removed from the coloring medium.

18 Claims, No Drawings

MEDIUM FOR COLORING LIVE BAIT WORMS

REFERENCE TO RELATED APPLICATION

This is a continuation of application No. 09/468,955, filed Dec. 22, 1999, now U.S. Pat. No. 6,240,876.

FIELD OF THE INVENTION

The present invention provides a method for coloring live bait worms, a storage and coloring medium for coloring live bait worms, and to live bait worms colored according to the present invention. More particularly, the invention relates to the incorporation into a storage medium for worms an amount of a colorant which, when ingested by the worms in a non-toxic quantity, changes their color.

BACKGROUND OF THE INVENTION

It is believed that the ability of a bait to attract fish is at least partially related to its color. Accordingly, numerous methods are disclosed in the prior art for coloring live bait to thereby enhance its efficacy in attracting fish. Examples of methods and materials for coloring the external surface of a live bait, such as a bait fish or a bait worm, are disclosed in U.S. Pat. No. 4,486,460 (Kienast et al.), U.S. Pat. No. 4,728,514 (Lechnir) and U.S. Pat. No. 4,776,858 (Mayer). These patents describe methods and compositions used for applying a colorant to an external surface of the live bait to thereby change its color. One disadvantage of such methods and compositions is that they must be applied to the live bait by the fisherman, and are therefore inconvenient.

Another method for coloring live bait worms is disclosed by U.S. Pat. No. 2,849,981 to Rose et al. According to Rose et al., it is possible to produce live worms of substantially any desired color by adding any conventional pure edible food coloring to food fed to the worms and/or to the beds of earth or other material in which the worms are cultivated. Preferably, sixteen parts of the pure edible food coloring are mixed with one part of a fruit or vegetable juice. It is stated by Rose et al. that one ounce of this mixture when applied to food which is fed to worms and to beds in which the worms are cultivated or shipped will effectively color approximately one hundred worms.

Although Rose et al. apparently discloses an effective method for coloring live worms, it has been found by the inventor of the present invention that many presently available edible food colorings are unsatisfactory for coloring live bait worms, and that the amount of food coloring recommended by Rose et al. is in many cases detrimental to the viability of the worms.

Therefore, there is a continued need for an effective method to color live bait worms.

SUMMARY OF THE INVENTION

The above-described disadvantages of presently known methods and compositions for coloring live bait are overcome by the present invention, which provides a method and composition for coloring live bait worms. In the method of the present invention, live bait worms are supported on a coloring medium comprising a worm storage medium containing a colorant. As the worms ingest the coloring medium, the colorant is assimilated into and onto the flesh of the worms by adhesion and adsorption, thereby causing them to become colored. The inventor has found that worms colored according to the invention are able to retain their color for prolonged periods of time after being removed from the coloring medium.

The inventor has found that the selection of an effective colorant is crucial both to the ability of the worms to absorb and retain the color, as well as to maintain the viability of the worms during the time they are stored in the coloring medium. Contrary to the teachings of Rose et al., the inventor has found through experiment that, in general, edible food colorings are ineffective coloring agents for live bait worms. The inventor believes that the ineffectiveness of edible food colorings is at least partially due to their insolubility in the worm storage medium as well as their tendency to be rapidly metabolized so as not to adhere to, or interact with, tissues such as mucous membranes in humans and other organisms. The inventor has also found that increasing the concentration of food coloring in the coloring medium to the levels disclosed by Rose et al., to improve coloring ability, can be detrimental to the viability of the worms during the time they are stored in the coloring medium.

Therefore, the colorants used in the present invention are selected from the group consisting of man-made color additives certified by the United States Food and Drug Administration (FDA) for use in drugs and cosmetics ("D&C color additives"), except those which are certified for use in foods. Preferred among such D&C color additives are xanthene dyes and salts thereof, more preferably the xanthene compounds designated by the FDA as D&C Yellow Nos. 7 and 8, D&C Red Nos. 22 and 28, FD&C Red 3 and D&C Orange 5.

One of the most preferred colorants according to the invention is D&C Yellow No. 8, which is very water soluble and therefore readily dissolves in moist worm storage media. Furthermore, the inventor has found that D&C Yellow No. 7 and D&C Yellow No. 8 are non-toxic to worms and provide the worms with an intense fluorescent chartreuse color which is believed to enhance their ability to attract fish.

DETAILED DESCRIPTION OF PREFERRED EMBODIMENTS

The method of the present invention is used to incorporate a colorant into a live bait worm. For this purpose, preferred bait worms according to the present invention are common earthworms such as *dendrobaena venetta* and *lumbricus terrestris*. After being collected from the earth, bait worms are typically transferred to a storage medium in quantities of about 500 worms per bulk bait box of volume 2.2 L until they are used as bait, or repackaged in smaller point-of-sale bait cups of volume 8 to 12 ounce, each typically containing from about 8 to 24 worms. The amount and composition of the storage medium is typically sufficient to permit the worms to survive for a period of about four to six weeks. For example, a bulk bait box containing about 2 to 3 kg of storage medium is sufficient to maintain about 500 worms in a viable state for about 4 to 6 weeks.

The worm storage media which may be used in the method and composition according to the invention include all conventional worm storage media, such as peat moss, peat loam, top soil, black soil and hydrated cellulose based media which include pulp, paper, cardboard, newsprint, etc. The storage medium according to the invention may preferably comprise mixtures of two or more of these worm storage media. The most preferred worm storage medium for use in the present invention is peat loam. These storage media all contain some amount of water. For example, the percentage of water in the peat loam medium is about 65 percent by weight of the medium.

In order to produce a coloring medium according to the present invention, a colorant is added to the storage medium in an amount which is non-toxic to the worms during the period in which they are stored in the coloring medium, and which will impart color to the worms.

As discussed above, the colorants used in the present invention are selected from the group consisting of man-made color additives certified by the United States Food and Drug Administration (FDA) for use in drugs, cosmetics and foods, and more preferably those which are certified for use in drugs and cosmetics only, referred to herein as "D&C color additives". Preferred among such FDA certified color additives are xanthene dyes and salts thereof, more preferably the xanthene compounds designated by the FDA as D&C Yellow Nos. 7 and 8, D&C Red Nos. 22 and 28, FD&C Red No 3 and D&C Orange No. 5. The structural formulas of these xanthene dyes are set out below. Mixtures of two or more colorants can be used to impart the desired color to the worms.

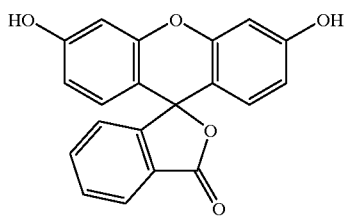

D & C Yellow No. 7
(Fluorescein)

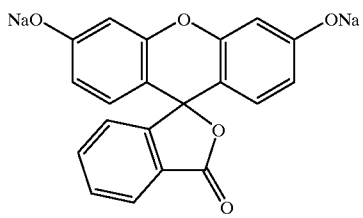

D & C Yellow No. 8
(Uranine)

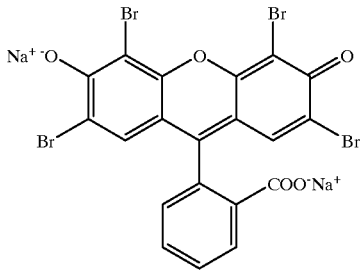

D & C Red No. 22
(Eosine Yellowish)

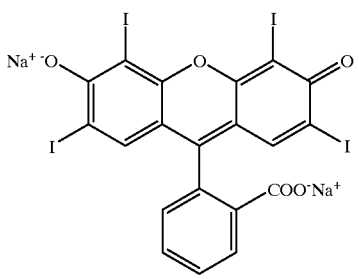

D & C Red No. 3
(Erythosine B)

-continued

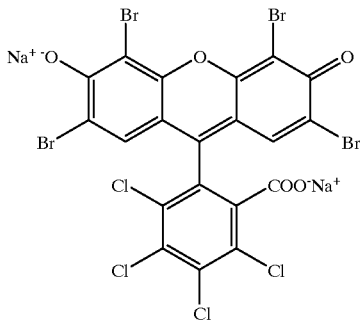

D & C Red No. 28
(Phloxine B)

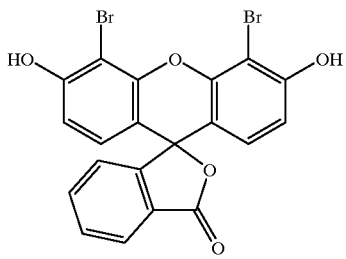

D & C Orange No. 5

The most preferred colorant according to the invention is D&C Yellow No. 8, also known as uranine, which is the disodium salt of D&C Yellow No. 7, also known as fluorescein. Since it is a salt, D&C Yellow No. 8 is highly soluble in water and readily dissolves in moist worm storage media. Furthermore, D&C Yellow No. 8 provides the worms with an intense fluorescent chartreuse color which is believed to enhance their ability to attract fish.

It is believed that the particular efficacy of D&C Yellow No. 8 over other colorants may be related to its high solubility in water, which permits its assimilation into and onto the flesh of the bait worms by adhesion and adsorption. The inventor has also found that D&C Yellow No. 8, as well as the other xanthene dyes mentioned above, are not detrimental to the viability of the worms as evidenced by their complete incorporation into the alimentary tract of the worm. In particular, the inventor has found that while a considerable amount of care needs to be taken with most dyes to control worm mortality, D&C Yellow Nos. 7 and 8 remain non-toxic even at high concentrations, for example in amounts of about 2500 mg/8 ounce bait cup containing 12 worms, or about 150 mg dye per worm.

In addition to the above advantages, D&C Yellow Nos. 7 and 8 can be readily removed from boats, hands, fishing gear, clothing etc. with soapy water, whereas many other dyes, particularly the triphenyls FD&C Blue No. 1 and FD&C Green No. 3 are difficult to remove. Furthermore, D&C Yellow Nos. 7 and 8, has an intense yellowish-green fluorescence which persists in extremely dilute, aqueous solutions (i.e. 1 part in 40 million). D&C Yellow No. 8 is also biodegradable, and is frequently used to trace the course of underground streams and factory and sewer effluents.

In one preferred embodiment of the invention, the coloring medium is prepared by adding 1 to 10 g, more preferably 3 to 6 g, still more preferably about 5.0 g of colorant per kg of storage medium. The colorant may preferably be added to the storage medium as a powder, granule, liquid or spray. This coloring medium can also be prepared as a concentrate for easier transportation or shipping, to be mixed with additional storage medium to make the above final amounts at a later time.

The process for coloring bait worms according to the present invention can include separate incubation and storage periods. This process can be carried out on bulk worm amounts of 100–1000 worms per container or on smaller point-of-sale quantities of 8–24 worms equally effectively. For example worms can be colored in bulk by incubating 100 to 1000, more preferably 300 to 600, still more preferably 500, regular worms in a standard Styrofoam bait box containing about 0.05 to 2.0 kg, more preferably 0.8 to 1.2 kg, and still more preferably 1.0 kg of the coloring medium according to the present invention at a temperature and for a time sufficient to permit the worms to become colored. Preferably the temperature of the storage medium with the worms is maintained in the range from about 34° F. to 75° F., more preferably at about 38° F. to 60° F., and still more preferably between 40° F. to 50° F. The activity of the worms is significantly greater at the higher end of this temperature range than at the lower end of the range. Thus, the incubation period at a temperature of about 50° F. to 60° F. is on the order of about 2 days to 4 days, whereas an incubation period of about 7 to 10 days is required at 34° F. to 40° F. Incubation of the worms should continue until they are the desired color and intensity.

After the incubation period, the bulk colored worms can also be stored in bulk by placing them in virgin storage medium, not containing any colorant. The inventor has found that bulk worms colored according to the present invention will retain their color for 7–10 days at 35° F. and for only about 3 days at 45° F. to 50° F. In order to extend the period, for which worms retain their color, for example to about four to six weeks, the coloring medium is preferably used to store the worms until they are used as bait. This will ensure that the worms have the proper color when they are used as bait. If the coloring medium is consumed by the bulk worms to the point where it no longer offers any nutritional value to the worms prior to their use as bait, the coloring medium can be supplemented with additional coloring medium or the coloring medium can be replaced entirely with fresh coloring medium. In this way, it is very easy to store the bulk worms, in a colored state, for any period of time from days, to weeks, months and even years.

Alternatively, after the incubation, the above bulk colored worms can be divided into smaller amounts and stored in actual point-of-sale containers ready for use as bait by the end user rather than in bulk containers. For example, 8–24 of the worms previously colored in bulk as described above can be added to a normal 8 to 12 ounce Styrofoam, paper, or plastic bait cup and topped with the coloring medium (containing 5 g colorant D&C Yellow 8 per kg of the storage medium). When the container is capped with a lid and stored at 34° F. to 38° F., the worms will remain viable, and colored for about four to six weeks and are ready for immediate use as bait.

In another application of the process, the incubation and storage can be carried out in the same vessel. For example 8–24 regular worms which have not been previously colored can be added to the bait cup and topped with the coloring medium prepared with D&C Yellow 8 and stored at 34° F. to 38° F. as above. In this case, the regular, uncolored, worms require an initial incubation period of about one week to lapsed before the worms acquire the desired color and intensity to be used as colored bait worms. The worms will then remain colored and viable in the bait cup of about four to six weeks. In both examples, the worms can be kept viable and colored indefinitely, if required, simply by changing the coloring medium once it has been consumed.

In another application of the invention the use of different coloring mediums for the incubation and storage periods is utilized. For example, regular, uncolored worms can be incubated in bulk utilizing coloring medium prepared with the colorant D&C Yellow 8. After the incubation period, point-of-sale quantities of 8–24 worms can be removed from this coloring medium and stored in a bait container which is topped up with a different coloring medium prepared with D&C Yellow 7 colorant. Due to the low water solubility of D&C Yellow 7, incubating worms with this dye results in slow dye uptake by the worms. However, worms dyed with D&C Yellow 8, and subsequently placed in fresh coloring medium containing D&C Yellow 7, will retain their color for an extended period of time. However, D&C Yellow 7 will not substantially color the medium, and therefore when the worms are eventually removed from the container and used as bait, there will be little or not staining of hands etc. by the dye.

In another example of the invention very large quantities of worms, on the order of many thousands of worms or many tens of thousands of worms can be colored by utilizing the coloring medium and very large containers or earth beds.

EXPERIMENTAL

The inventor conducted numerous experiments to determine the effectiveness of a number of color additives to color live bait worms. The results of these experiments are summarize in the following Table I.

TABLE I

Effectiveness of dye and respective Solubility in water (mg/ml at 25° C.)

| Colorant | Solubility | Chemical Class | Effectiveness as worm coloring agent |
|---|---|---|---|
| FD&C Dyes | | | |
| FD&C Red 40 | 22 | Monoazo | No coloration. Worms remain viable |
| FD&C Yellow 6 | 19 | Monoazo | No coloration. Worms remain viable |
| FD&C Blue 2 (pure and lake) | 2 | Indigoid | No coloration. Worms remain viable |
| FD&C Red 3 | | Xanthene ($Na^+$) | Worms become and remained pinkish/red when used in amounts of 50–800 mg. |
| FD&C Yellow 5 | 20 | Pyrazolone | Color not retained. Worms remain viable |
| FD&C Green 3 | 20 | Triphenyl methane | Color not retained. Worms remain viable |
| FD&C Blue 1 | 20 | Triphenyl methane | Worms become and remain blue. Worms viable if carefully applied. Very difficult to use due to dusting. Dye stains hands, fishing equipment easily although extremely difficult to remove. |
| D&C Dyes | | | |
| D&C Yellow 8 | 30 | Xanthene ($Na^+$) | Worms become and remain bright Chartreuse in color even with concentrations as low as 25 mg. Preferred range for commercial application is between 200–600 mg). Worms remain very healthy and viable even in very high concentration of >2500 mg. Excess color can be removed from hands and fishing gear readily by washing. |

TABLE I-continued

Effectiveness of dye and respective Solubility in water (mg/ml at 25° C.)

| Colorant | Solubility | Chemical Class | Effectiveness as worm coloring agent |
|---|---|---|---|
| D&C Yellow 7 | 0.3 | Xanthene (free acid) | Worms become and remain bright Chartreuse in color even with concentrations as low as 25 mg. Preferred range for commercial application is between 200–600 mg. Worms remain very healthy and viable even in very high concentrations of >2500 mg. Excess color can be removed from hands and fishing gear readily by washing. Low solubility in water makes this colorant less environmentally intrusive. |
| D&C Red 22 | 33 | Xanthene ($Na^+$) | Worms become and remain pinkish/red when used in concentrations of 50–800 mg. Mortality begins to become a factor at the upper end of this range. |
| D&C Red 28 | 9 | Xanthene ($Na^+$) | Worms become pinkish red when used in concentration between 50–800 mg. Increased mortality near upper end of this range. |
| D&C Orange 5 | 0.3 | Xanthene (acid free) | Worms become and remain orange in concentrations of 50–800 mg. Mortality increases at upper range. |

EXPERIMENTAL PROCEDURE

Each powdered colorant was mixed with peat loam medium and added to an 8 oz cup containing 12 healthy and natural worms. Concentrations given as mg colorant per 8 oz cup containing about 120 g peat loam. Worms were inspected for color and viability 24 hrs., 36 hrs., and when still viable, 3–4 weeks later.

Although the invention has been described in connection with certain preferred embodiments, it is not intended to be limited thereto. Rather, the invention includes all embodiments which may fall within the scope of the following claims.

What is claimed is:

1. A medium for storing and coloring live bait worms, comprising:
   a. a cultivation bed containing one or more storage media adapted to sustain said bait worms in a living state; and
   b. an amount of a colorant which is non-toxic to said live bait worms and which is sufficient to impart color to said live bait worms, said colorant comprising one or more D&C color additives selected from the group consisting of xanthene dyes.

2. The medium according to claim 1, wherein said storage medium is comprised of one or more members of the group consisting of peat loam, peat moss, top soil, black soil and hydrated cellulose-based media.

3. The medium according to claim 2, wherein the storage medium comprises peat loam.

4. The medium according to claim 2, wherein the hydrated cellulose-based media is comprised of one or more members of the group consisting of hydrated pulp, paper, cardboard and newsprint.

5. The medium according to claim 1, wherein said xanthene dyes are selected from the group consisting of D&C Yellow No. 7, D&C Yellow No. 8, FD&C Red No. 3, D&C Red No. 22, D&C Red No. 28 and D&C Orange No. 5.

6. The medium according to claim 5, wherein said xanthene dyes are selected from the group consisting of D&C Yellow No. 8 and D&C Yellow No. 7.

7. The medium according to claim 1, wherein the amount of colorant added to the cultivation bed is about 1 to 10 g/kg of said one or more storage media.

8. The medium according to claim 1, comprising a concentrate to be mixed with an additional amount of said one or more storage media prior to being used for storing and coloring live bait worms.

9. A bait for fishing comprising a living bait worm normally used in its normal live state as fish bait, said bait worm being colored by a process comprising:
   a. providing a cultivation bed containing one or more storage media adapted to sustain such bait worms in a living state;
   b. adding to said cultivation bed a non-toxic amount of a colorant to thereby form a coloring medium, said colorant comprising one or more D&C color additives selected from the group consisting of xanthene dyes; and
   c. incubating said live bait worms in said coloring medium at a temperature and for a time sufficient to allow said bait worms to ingest an amount of said coloring medium and thereby become colored by said colorant.

10. The bait according to claim 9, wherein said xanthene dyes are selected from the group consisting of D&C Yellow No. 7, D&C Yellow No. 8, FD&C Red No. 3, D&C Red No. 22, D&C Red No. 28 and D&C Orange No. 5.

11. The bait according to claim 10, wherein said xanthene dyes are selected from the group consisting of D&C Yellow No. 8 and D&C Yellow No. 7.

12. A kit for preparing a medium for storing and coloring live bait worms, comprising:
   a. a cultivation bed containing one or more storage media adapted to sustain said bait worms in a living state; and
   b. an amount of a colorant which is non-toxic to said live bait worms and which is sufficient to impart color to said live bait worms, said colorant comprising one or more D&C color additives selected from the group consisting of xanthene dyes.

13. The kit according to claim 12, wherein said xanthene dyes are selected from the group consisting of D&C Yellow No. 7, D&C Yellow No. 8, FD&C Red No. 3, D&C Red No. 22, D&C Red No. 28 and D&C Orange No. 5.

14. The kit according to claim 13, wherein said xanthene dyes are selected from the group consisting of D&C Yellow No. 8 and D&C Yellow No. 7.

15. The kit according to claim 12, wherein said storage medium is comprised of one or more members of the group consisting of peat loam, peat moss, top soil, black soil and hydrated cellulose-based media.

16. The kit according to claim 15, wherein the hydrated cellulose-based media is comprised of one or more members of the group consisting of hydrated pulp, paper, cardboard and newsprint.

17. The kit according to claim 15, wherein the storage medium comprises peat loam.

18. The kit according to claim 12, wherein the colorant is in the form of a powder, granule, liquid or spray.

* * * * *